United States Patent

Mahmoodi

Patent Number: 5,774,601
Date of Patent: Jun. 30, 1998

[54] SYSTEM AND METHOD FOR ADAPTIVE INTERPOLATION OF IMAGE DATA

[75] Inventor: Abolghassem B. Mahmoodi, St. Paul, Minn.

[73] Assignee: Imation Corp., Oakdale, Minn.

[21] Appl. No.: 816,816

[22] Filed: Mar. 18, 1997

Related U.S. Application Data

[63] Continuation of Ser. No. 344,561, Nov. 23, 1994, abandoned.

[51] Int. Cl.$^6$ .................................................... G06K 9/42
[52] U.S. Cl. ......................... 382/298; 358/428; 364/577
[58] Field of Search ........................... 345/138; 348/581; 358/428, 525; 364/577, 723; 382/28, 299, 300

[56] References Cited

U.S. PATENT DOCUMENTS

| | | | |
|---|---|---|---|
| 4,468,693 | 8/1984 | Fujita | 358/525 |
| 4,583,128 | 4/1986 | Anderson, Jr. | 358/298 |
| 4,595,958 | 6/1986 | Anderson, Jr. et al. | 358/296 |
| 5,008,752 | 4/1991 | Van Nostrand | 358/160 |
| 5,048,105 | 9/1991 | Adachi | 382/300 |
| 5,125,042 | 6/1992 | Kerr | 382/300 |
| 5,202,670 | 4/1993 | Oha | 340/728 |
| 5,294,998 | 3/1994 | Piovoso | 382/300 |
| 5,319,719 | 6/1994 | Nakazawa | 382/132 |
| 5,327,257 | 7/1994 | Hrytzak | 358/448 |
| 5,353,239 | 10/1994 | Kashiwagi | 364/571.02 |
| 5,369,499 | 11/1994 | Yip | 358/447 |

FOREIGN PATENT DOCUMENTS

| | | | |
|---|---|---|---|
| 0 244 141 | 11/1987 | European Pat. Off. | G06F 15/62 |
| WO 90/216035 | 12/1990 | WIPO | G06F 15/353 |

OTHER PUBLICATIONS

Parker, J. Anthony, Kenyon, Robert V., and Troxel, Donald E., "Comparison of Interplating Methods for Image Resampling", *IEEE*, vol. MI 2, No. 1, Mar. 1983, pp. 31–39.

Mahmoodi, A.B., 3M Medical Imaging Systems Division, "Adaptive Image Interpolation Algorithm", SPIE Medical Imaging Conf., Newport Beach, Feb. 1993.

*Primary Examiner*—Dwayne D. Bost
*Assistant Examiner*—Brian L. Johnson
*Attorney, Agent, or Firm*—William K. Weimer

[57] ABSTRACT

A system and method for adaptive interpolation of image data selects one of a plurality of different interpolation kernel functions based on one or more variables, such as a selected format for the visible presentation of the interpolated image data on an output imaging media, a selected type of the output imaging media for visible presentation of the interpolated image data, and an appearance characteristic, such as sharpness or smoothness, of the visible presentation of the interpolated image data. The system and method select an appropriate interpolation kernel function to improve an appearance of the visible presentation of the interpolated image data on the output imaging media.

42 Claims, 2 Drawing Sheets

FIG. 3

SYSTEM AND METHOD FOR ADAPTIVE INTERPOLATION OF IMAGE DATA

This is a continuation of application Ser. No. 08/344,561 filed Nov. 23, 1994 abandoned.

FIELD OF THE INVENTION

The present invention relates to image processing techniques, and, more particularly, to interpolation techniques for expansion of digital image data for presentation on output media.

DISCUSSION OF RELATED ART

A digital laser imager forms a visible representation of an image on imaging media, such as photosensitive film, based on a set of image data representative of the image. The image data contains a plurality of digital image values acquired by an input imaging device. In a medical imaging environment, the input imaging device may comprise, for example, a diagnostic device, such as a magnetic resonance (MR), computed tomography (CT), conventional radiography (X-ray), or ultrasound device. Thus, the image data may represent an image of a physiological object obtained for diagnostic purposes. Each of the digital image values corresponds to one of a plurality of pixels in the original image, and represents an optical density associated with the respective pixel. The laser imager processes the digital image values to generate laser drive values. Each of the laser drive values represents an exposure level calculated to reproduce, on the imaging media, the optical density of a pixel in the original image. The laser drive values are used to modulate the intensity of a scanning laser, thereby exposing imaging media with a particular level of exposure. The laser imager subsequently develops the imaging media to form the visible representation of the original image.

The number of pixels represented by the image data can be significantly less than the resolution of the imaging media. For example, laser imagers include scanning lasers capable of producing an output resolution of 300 pixels per inch however, the original image may be represented by image data comprising as little as a 256 by 256 array of pixels. The laser imager may provide different formats that enable a user to select the number of images to be formed. The number of images formed on the imaging media determines the size of each image. If a particular format requires that the laser imager form an image in a two inch (4.08 cm) by two inch (4.08 cm) area on the imaging media, a 512 by 512 pixel set of image data must be expanded by at least twenty-five percent to match the 300 pixels per inch resolution of the laser imager. With formats requiring larger sizes, it is necessary to expand the image data by much greater amounts. An eight inch (20.32 cm) by ten inch (25.4 cm) format for an entire sheet of imaging media, for example, would require eight-times expansion of the 512 by 512 pixel set of image data, resulting in a 4096 by 4096 pixel set of image data. In contrast, formats producing smaller sizes require that the image data be reduced.

Expansion involves resampling of the originally sampled image data at a higher rate dependent on the amount of expansion required. Reduction involves resampling of the originally sampled image data at a lower rate dependent on the amount of reduction required. Resampling is carried out by performing interpolation on the original image data to effectively fit a curve to the original image data. For expansion, the curve is resampled at a higher rate than the original image data to create intermediate pixel points between those available from the originally sampled image data. For reduction, the curve is resampled at a lower rate than the original image data. The resampling process transforms the image data into an image having a higher spatial resolution for expansion and a lower spatial resolution for reduction. Unfortunately, the resampling rates for expansion can degrade image quality by loss of high frequency information, introducing perceived blurring and other artifacts into the expanded image data. To preserve image quality, it would be desirable to have an interpolation function that exhibits an ideal low-pass filter spectrum. The ideal low-pass filter would remove replicates of the frequency introduced by the resampling. The implementation of an ideal low-pass filter is not feasible, however, because it would require the availability of many surrounding data points for each interpolated pixel.

Several proposed interpolation functions seek to approximate the effect of an ideal low-pass filter. Such interpolation functions generally fall into two categories, commonly referred to as (1) "two-point" interpolation and (2) "four-point" interpolation. One type of "two-point" interpolation involves "pixel replication" interpolation, whereby sample points between two adjacent original pixels are simply assigned the intensity values of the closest adjacent original pixel. Another type of "two-point" interpolation involves "bilinear" interpolation, whereby sample points between two adjacent original pixels are assigned linearly weighted intensity values based on distance from the closest adjacent original pixel. Other "two-point" interpolation techniques are implemented by third order, fifth order, seventh order, etc., polynomial kernel functions.

"Four-point" interpolation may involve the application of a cubic spline function. The four-point interpolation carried out by application of the cubic spline function involves much more computation than two-point interpolation. The cubic spline function has been found to produce a better spatial frequency response than two-point interpolation functions in most cases, providing a closer approximation of the ideal low-pass filter spectrum. For certain types of image data, however, a cubic spline interpolation function may produce a less than optimum interpolated image, relative to two-point interpolation functions such as bilinear interpolation or pixel replication. To improve interpolation results for image data representing alphanumeric information, for example, it may be necessary to use a different type of interpolation than that used for data representing pictorial information.

Some existing interpolation techniques enable switching between different interpolation functions based on the type of image data to be interpolated. U.S. Pat. No. 5,008,752 discloses an interpolator for applying two different types of interpolation functions depending on the type of image data present. This technique switches between different interpolation functions when a difference between successive pixel values exceeds a predetermined threshold, indicating a transition from pictorial to text information. U.S. Pat. No. 4,468,693 discloses an interpolation apparatus that allows a user to manually switch between cubic spline interpolation, bilinear interpolation, and pixel replication interpolation according to the user's preference. U.S. Pat. No. 5,327,257 discloses an apparatus that applies more than one interpolation function to a set of image data to achieve a desired appearance. This apparatus creates both a sharp interpolated image and a smooth interpolated image by applying a cubic spline function to a set of image data, and then creating a third image by combining the sharp and smooth interpolated images with selected weighting coefficients to produce a sharp or smooth resultant image.

The above patent disclosures generally address the effectiveness of different types of interpolation functions for different types of image data. However, the effect of other image processing variables has not been adequately addressed. For example, the effectiveness of a particular interpolation function may vary according to the degree of expansion required by the format of the image data on the imaging media. If a format requires a large image expansion factor for an image, it is, of course, necessary to create a greater number of intermediate pixels between adjacent original unexpanded pixels. As a result, there will be a higher chance of introducing imaging artifacts such as blurring. If the format selection calls for an smaller expansion rate, however, the blurring will be less perceptible. Hence, an interpolation function considered inappropriate for use with larger expansion rates, due to high incidence of blurring, may nevertheless be appropriate for use with smaller expansion rates.

In addition, the response characteristics of different imaging media can greatly affect the visible results of the interpolation. It has been observed, for example, that dry silver film has a development speed that is significantly slower than that of conventional silver halide film, in both toe and shoulder speeds. This slower development speed can render interpolation functions previously considered effective for silver halide films less effective for dry silver film. The slower development speed requires that the scanning laser transmit a higher exposing energy to the imaging media to achieve a desired maximum optical density. The higher exposing energy translates to a larger dynamic range for the scanning laser in order to expose every gradation on the imaging media. However, the available dynamic range of existing, commercially available scanning lasers, such as laser diodes, may be limited for required exposing wavelengths in the infra-red regions. As a result, the scanning laser may be incapable of producing the desired number of gradations. The slower development speed of the dry silver film, given the limitations of the scanning laser, can result in loss of high spatial frequencies. The visible manifestation of the loss of high spatial frequencies may be a loss of apparent edge sharpness producing an undesirable blurring in high contrast areas. The blurring is particularly apparent in those areas involving a transition from image data representing alphanumeric text at a minimum density to image data representing pictorial information at much higher densities approaching maximum density. Therefore, an interpolation function considered appropriate for silver halide film may produce inadequate results with a dry silver film.

As a further variation, presentation of the image data on alternate output media such as a cathode ray tube (CRT) display monitor, having a different response characteristic than film, can also affect the visible results of interpolation functions. A CRT monitor medium has several problems when compared to a print film for image presentation. For example, a CRT monitor suffers from severe dynamic range limitations (maximum intensity to minimum intensity range) relative to film. The dynamic range of a CRT monitor limits perceptible image gradation presentation to about 100–150 levels as compared to print films, which may provide 1500–2000 levels of gradation. Thus, like dry silver film, CRT monitors may suffer blurring in high contrast areas. It is noted, however, that the blurring suffered by a CRT monitor may be much more pronounced than that on dry silver film. In addition, a CRT monitor produces viewing glare and geometric distortion not present in films. Thus, the perception of fine edges and detail is much more difficult for CRT monitors than for print films. Due to the smaller number of gradation levels, and the glare and distortion in a CRT monitor, an interpolation function appropriate for a film may be inappropriate for a CRT monitor.

Existing interpolation techniques generally fail to address the effect of format and/or media variations on interpolation results. Consequently, image quality continues to be a concern for interpolated images formed with different formats on different imaging media. Accordingly, there is a need for an interpolation system capable of selecting interpolation functions appropriate for particular formats and/or different imaging media.

SUMMARY OF THE INVENTION

In view of the limitations of existing interpolation techniques, the present invention is directed to a system and method for adaptive interpolation of image data. The system and method of the present invention are capable of selecting one of a plurality of different interpolation kernel lookup tables based on a format selected for the image data. The system and method of the present invention also are capable of selecting one of a plurality of different interpolation kernel lookup tables based on an imaging media selected for presentation of the image data. By addressing variations in format and media, the system and method of the present invention enable application of an appropriate interpolation kernel to the image data to improve visible results. As a further advantage, the system and method of the present invention are capable of selecting one of the interpolation kernel lookup tables to achieve a particular appearance characteristic based on a degree of sharpness or smoothness desired by a user.

Additional features and advantages of the present invention will be set forth in part in the description that follows, and in part will be apparent from the description, or may be learned by practice of the present invention. The advantages of the present invention will be realized and attained by means particularly pointed out in the written description and claims hereof, as well as in the appended drawings.

To achieve the foregoing advantages, as broadly embodied and described herein, the present invention provides, in a first embodiment, a system for performing interpolation on image data representative of a plurality of pixels within an image to produce interpolated image data representing interpolated pixels, the system comprising media selection means for selecting one of a plurality of imaging media for presentation of the image, format selection means for selecting one of a plurality of formats for presentation of the image on the imaging media, appearance characteristic selection means for selecting one of a plurality of appearance characteristics of the presentation of the image on the imaging media, a memory storing a plurality of different interpolation kernel lookup tables, each of the interpolation kernel lookup tables containing a plurality of interpolation coefficients, interpolation kernel selection means for selecting, based on a combination of the format selected by the format selection means, the media selected by the media selection means, and the appearance characteristic selected by the appearance characteristic selection means, one of the interpolation kernel lookup tables stored in the memory, and interpolating means for applying the interpolation coefficients contained in the selected interpolation kernel lookup table to the image data to produce the interpolated image data.

In a second embodiment, the present invention provides a system for performing interpolation on image data representative of a plurality of pixels within an image to produce interpolated image data, the system comprising format selection means for selecting one of a plurality of formats for presentation of the image on imaging media, a memory storing a plurality of different interpolation kernel lookup tables, each of the interpolation kernel lookup tables containing a plurality of interpolation coefficients, interpolation kernel selection means for selecting, based on the format selected by the format selection means, one of the interpolation kernel lookup tables stored in the memory, and interpolation means for applying the selected interpolation kernel lookup table to the image data to produce the interpolated image data.

In a third embodiment, the present invention provides a system for performing interpolation on image data representative of a plurality of pixels within an image to produce interpolated image data, the system comprising media selection means for selecting one of a plurality of imaging media for presentation of the image, a memory storing a plurality of different interpolation kernel lookup tables, each of the interpolation kernel lookup tables containing a plurality of interpolation coefficients, interpolation kernel selection means for selecting, based on the media selected by the media selection means, one of the interpolation kernel lookup tables stored in the memory, and interpolation means for applying the selected interpolation kernel lookup table to the image data to produce the interpolated image data.

In a fourth embodiment, the present invention provides a method for performing interpolation on image data representative of a plurality of pixels within an image to produce interpolated image data representing interpolated pixels, the method comprising the steps of selecting one of a plurality of imaging media for presentation of the image, selecting one of a plurality of formats for presentation of the image on the imaging media, selecting one of a plurality of appearance characteristics of the presentation of the image on the imaging media, selecting one of a plurality of different interpolation kernel lookup tables based on a combination of the selected media, the selected format, and the selected appearance characteristic, each of the interpolation kernel lookup tables containing a plurality of interpolation coefficients, and applying the interpolation coefficients contained in the selected interpolation kernel lookup table to the image data to produce the interpolated image data.

In a fifth embodiment, the present invention provides a method for performing interpolation on image data representative of a plurality of pixels within an image to produce interpolated image data, the method comprising the steps of selecting one of a plurality of formats for presentation of the image on imaging media, selecting one of a plurality of different interpolation kernel lookup tables based on the selected format, each of the interpolation kernel lookup tables containing a plurality of interpolation coefficients, and interpolation means for applying the selected interpolation kernel lookup table to the image data to produce the interpolated image data.

In a sixth embodiment, the present invention provides a method for performing interpolation on image data representative of a plurality of pixels within an image to produce interpolated image data, the method comprising the steps of selecting one of a plurality of imaging media for presentation of the image, selecting one of a plurality of different interpolation kernel lookup tables based on the selected media, each of the interpolation kernel lookup tables containing a plurality of interpolation coefficients, and interpolation means for applying the selected interpolation kernel lookup table to the image data to produce the interpolated image data.

It is to be understood that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

Figure 1:
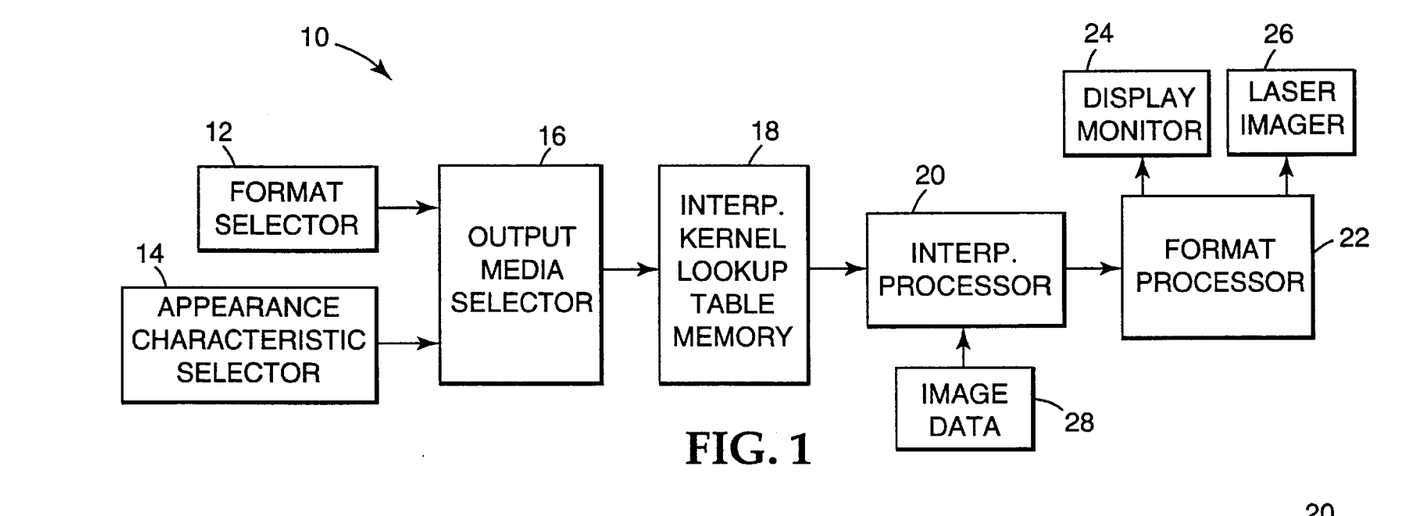
FIG. 1 is a functional block diagram of a system for adaptive interpolation of image data, in accordance with the present invention.

FIG. 1 is a functional block diagram of a system 10 for adaptive interpolation of digital image data, in accordance with the present invention. As shown in FIG. 1, system 10 includes a format selector 12, an appearance characteristic selector 14, an output media selector 16, an interpolation kernel lookup table memory 18, an interpolation processor 20, and a formatting processor 22. The system 10 further includes one or more output media provided by a cathode ray tube (CRT) display monitor 24 and a digital laser imager 26. The interpolation processor 20 receives image data, as indicated by block 28, from an input imaging device. In a medical imaging environment, the input imaging device may comprise, for example, a diagnostic device, such as a magnetic resonance (MR), computed tomography (CT), conventional radiography (X-ray), or ultrasound device. Thus, image data 28 may represent an image of a physiological object obtained for diagnostic purposes.

The image data 28 received by interpolation processor 20 is representative of a plurality of pixels within the image. The number of pixels represented by image data 28 can be significantly less than the output resolution of output imaging media used for visible presentation of the image. The system 10 is configured to perform interpolation on image data 28 to produce interpolated image data representing the original pixels and interpolated pixels. The system 10 selects one of a plurality of interpolation kernel lookup tables based on a combination of a selected format, a selected output media, and a selected appearance characteristic of the image. The interpolation kernel lookup tables contain interpolation coefficients that are applied to the original pixels in image data 28 to produce interpolated pixels, thereby transforming the spatial resolution of image data 28 to match the resolution of the output media.

The format selector 12 selects one of a plurality of formats for presentation of an image on imaging media. The format selector 12 enables a system user to select a format representing a number of images to be formed on a single page of the output imaging media. As an example, system 10 may provide formats for as many images as can be accommodated by a single page of media or, as a practical matter, as many images as can be viewed for useful diagnostic purposes. The term "page," as used herein, may refer to a sheet of photosensitive media such as film printed by laser imager 26, or a screen displayed by CRT display monitor 24. The format selector 12 can be realized, for example, by a user interface associated with a display panel on laser imager 26 or by a manual control panel on laser imager 26. The number of images specified by the selected format determines the size of each individual image to be formed on the imaging media. The size of each image determines the amount of expansion necessary to match the resolution of image data 28 to that of the output media.

The appearance characteristic selector 14 selects one of a plurality of appearance characteristics of the presentation of the image on the imaging media. The appearance characteristics may include a plurality of degrees of apparent sharpness of the image relative to a degree of apparent smoothness, when viewed by a human observer. The terms "sharpness" and "smoothness," as used herein, refer to degrees of apparent edge contrast between original pixels and interpolated pixels in the image, when viewed by a human observer. The appearance characteristic selector 14 enables a user to select a degree of apparent edge contrast in the visible representation of the image when formed on the imaging media to provide a more pleasing or diagnostically useful appearance. The format selector 12 can be realized, for example, by a user interface associated with a display panel on laser imager 26 or by a manual control panel on laser imager 26.

The media selector 16 selects one of a plurality of imaging media for visible presentation of the image represented by image data 28. Specifically, media selector 16 enables the user to select either CRT monitor 24 or laser imager 26, and also the type of imaging media printed by the laser imager. For example, laser imager 26 may be configured to print the image on either wet chemically processed silver halide film or thermographic dry silver film. The laser imager 26 conceivably could be configured to print images on other types of thermographic film. The media selector 16 can be realized, for example, by a user interface associated with a display panel on laser imager 26 or by a manual control panel on laser imager 26. Alternatively, media selector 16 may be configured to respond automatically to media selection information sent with image data 28 from an input imaging device.

The interpolation kernel lookup table memory 18 stores a plurality of different interpolation kernel lookup tables. Each of the interpolation kernel lookup tables contains a plurality of interpolation coefficients calculated according to particular interpolation kernel functions. The interpolation kernel lookup tables may include, for example, at least one interpolation kernel lookup table containing a plurality of two-point interpolation coefficients and at least one interpolation kernel lookup table containing a plurality of four-point interpolation coefficients. In particular, memory 18 may store a variety of interpolation kernel lookup tables including an interpolation kernel lookup table containing a plurality of pixel replication interpolation coefficients, an interpolation kernel lookup table containing a plurality of bilinear interpolation coefficients, an interpolation kernel lookup table containing a plurality of third order polynomial interpolation coefficients, an interpolation kernel lookup table containing a plurality of fifth order polynomial interpolation coefficients, and one or more interpolation kernel lookup tables containing a plurality of cubic spline interpolation coefficients.

The interpolation processor 20 selects one of the interpolation kernel lookup tables stored in memory 18 based on a combination of the format selected by format selector 12, the media selected by media selector 16, and the appearance characteristic selected by appearance characteristic selector 14. The particular interpolation kernel lookup table selected by interpolation processor 20 produces interpolated image data having an optimum visible appearance, given the format, media, and appearance characteristic specified by the user. The interpolation processor 20 determines a sampling increment based on the amount of pixels required by the selected format and the amount of original pixels provided by image data 28. The interpolation processor 20 then applies interpolation coefficients contained in the selected interpolation kernel lookup table that correspond to the sampling increment to image data 28 to produce the interpolated image data.

The format processor 22 receives the interpolated image data produced by interpolation processor 20, and prepares the interpolated image data for presentation on a single page of output imaging media. Specifically, format processor 22 assembles the interpolated image data produced for each of a number of images to be printed or displayed on a single page according to a format selected by the user. The format processor 22 assigns the interpolated image data for each image to a particular area of the page, and then rasterizes the assembled image data for application to drive either display monitor 24 or laser imager 26.

Figure 2:
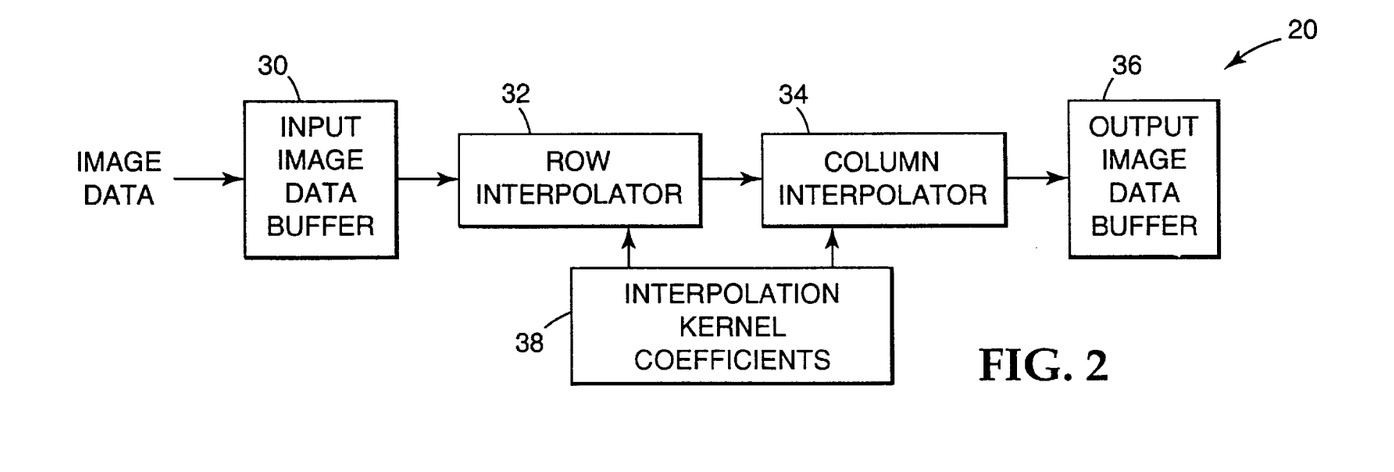
FIG. 2 is a functional block diagram of an interpolation processor for incorporation in the system of FIG. 1, in accordance with the present invention.

FIG. 2 is a functional block diagram of the interpolation processor 20 shown in FIG. 1, in accordance with the present invention. As shown in FIG. 2, processor 20 includes an input image data buffer 30, a row interpolator 32, a column interpolator 34, and an output image data buffer 36. The input image data buffer 30 receives image data 28 from an input imaging device. The row interpolator 32 processes original pixel values along each row of image data 28 and interpolates them based on interpolation coefficients retrieved from the selected interpolation kernel table, as indicated by block 38. The row interpolator 32 multiplies the original pixel values by corresponding interpolation coefficients 38, selected according to the sampling rate, and sums the product to produce interpolated row pixel values. The resulting interpolated row pixel values each correspond to an interpolated pixel in the image, and represent an intensity of that interpolated pixel. The interpolated row pixel values create additional columns of interpolated pixels between columns of original pixels in image data 28. The intensity of each interpolated pixel is a function of the intensities of the original pixel values to which the interpolation coefficients were applied, and the values of the interpolation coefficients.

Once a plurality of rows of original pixels have been interpolated by row interpolator 32, column interpolator 34 processes them to produce interpolated column pixel values. Specifically, column interpolator 34 interpolates both the original row pixels and the interpolated row pixels along a column based on interpolation coefficients 38 retrieved from the selected interpolation kernel table. The column interpolator 34 multiplies the original row pixels and the interpolated row pixels along a column by corresponding interpolation coefficients, and sums the product to produce interpolated column pixel values. The interpolated column pixel values create additional rows of interpolated pixels between rows of original pixels and interpolated pixels. Again, the intensity of each interpolated column pixel is a function of the intensities of the original column pixel values to which the interpolation coefficients were applied, and the values of the interpolation coefficients. After processing by row interpolator 32 and column interpolator 34, the interpolated image data is sent to output image data buffer 36. The image data is stored in output image data buffer 36 until retrieved by format processor 22.

The row interpolator 32 and column interpolater 34 perform interpolation of image data 28 in a well known manner. The following FORTRAN code is provided, however, for purposes of illustration. The code illustrates the computation involved in a four-point interpolation process using a cubic spline interpolation kernel function, a two-point interpolation process using a fifth order polynomial function, and a two-point interpolation process using bilinear interpolation.

```
c       Four-point interpolation Cubic Spline
c       Parameter "ca" is set to "-1."
c       u1, u2, u3, u4 are the calculated coefficients from
c       Cubic Spline kernel function
c       In this example, a 200% interpolation is shown.
c================================================================
c
        ca =-1.
        do 100 i=0,4
        c1 = float(i)/4.0
        u1(i) = ca*(c1**3)-(2.*ca*(c1**2))+ca*c1
        u2(i) = (ca+2)*(c1**3)-(ca+3.)*(c1**2)+1.
        u3(i) = -(cat+2.)*(c1**3)+((2.*ca+3)*(c1**2))-ca*c1
        u4(i) = ca*(c1**3)+ca*(c1**2)
100     continue
c
c================================================================
c       Two point interpolation using a 5th order polynomial
c       In this example, a 200% interpolation is shown
c================================================================ do 200 i=0,4
        c1 = float(i)/4.0
        u1(i) = 0.
        u2(i) = 1-(10.*(c1**3))+(15.*(c1**4))-(6.*(c1**5))
        u3(i)= 1-(10.*((1-c1)**3))+(15.*((1-c1)**4))-(6.*((1-c1)**5))
        u4(i) = 0.
c================================================================
c       Two point interpolation using Bilinear
c       In this example a 200% interpolation is shown
c================================================================
        c1 = float(i)/4.0
        u1(i) = 0.
        u2(i) =1 -c1
        u3(i) = c1
        u4(i) = 0.
200     continue
c================================================================
c       In this example "mbb(i,k)" are the expanded image data
c       and "mnb(i,k)" are the unexpanded original image data.
c************** Interpolation Row **************
c
c
        do 301 i = 1,4
        do 301 k = 0,3
        mbb(i,k+1)=u1(k)*mnb(i, 1)+u2(k)*mnb(i,2)+u3(k)*mnb(i,3)
1       +u4(k)*mnb(i,4)
        if(mbb(i,k+1) .ge. 4095)mbb(i,k+1)=4095
        if(mbb(i,k+1) .le. 0)mbb(i,k+1)=0
301     continue
c
c*************Interpolation Column************
c
        do 302 i=1,4
        do 302 k=0,3
        mb(k+1,i)=u1(k)*mbb(1,i)+u2(k)*mbb(2,i)+u3(k)*mbb(3,i)
1       +u4(k)*mbb(4,i)
        if(mb(k+1,i) .ge. 4095)mb(k+1,i)=4095
        if(mb(k+1,i) .le. 0)mb(k+1,i)=0
302     continue
c================================================================
```

An example of the interpolation kernel lookup tables stored in memory 18 and the manner in which interpolation processor 20 selects one of the interpolation kernel lookup tables will now be described. In this example, memory 18 stores interpolation lookup tables containing interpolation coefficients that represent the following interpolation kernel functions:

A. Two-Point Interpolation Kernel Functions

1. Pixel Replication Kernel Function. This two-point interpolation kernel lookup table contains interpolation coefficients representative of a conventional pixel replication interpolation kernel function $K_1(x)$, whereby interpolated pixels between two adjacent original pixels are simply assigned the intensity values of the closest original pixel. This interpolation kernel function can be expressed as:

$$K_1(x) = 1 \quad |x| <= 0.5$$
$$K_1(x) = 0 \quad |x| > 0.5$$

where x is a variable representing a location of the interpolated pixel relative to the original pixels. The pixel replication interpolation kernel produces a sharp apparent edge contrast between pixels in the interpolated image data.

2. Bilinear Interpolation Kernel Function. This two-point interpolation kernel lookup table contains interpolation coefficients representative of a conventional bilinear interpolation kernel function $K_2(x)$, whereby interpolated pixels between two adjacent original pixels are assigned linearly weighted intensity values based on distance from the closest adjacent original pixel. This interpolation kernel function $K_2(x)$ can be expressed as:

$$K_2(x) = 1 - |x| \quad 0 <= |x| <= 1$$
$$K_2(x) = 0 \quad |x| > 1$$

This bilinear interpolation kernel function produces a smoother apparent edge contrast between pixels in the interpolated image data, relative to pixel replication.

3. Third Order Polynomial Kernel Function. This two-point interpolation kernel lookup table contains interpolation coefficients representative of a conventional third order polynomial kernel function $K_3(x)$, whereby interpolated pixels between two adjacent original pixels are assigned intensity values based on the following expression:

$$K_3(x) = 2|x|^3 - 3|x|^2 + 1 \quad 0 <= |x| <= 1$$
$$K_3(x) = 0, \quad |x| > 1$$

This third-order polynomial kernel function produces an apparent edge contrast between pixels in the interpolated image that is sharper than that produced by the bilinear interpolation kernel function $K_2(x)$, but smoother than that produced by the pixel replication interpolation kernel function $K_1(x)$.

4. Fifth Order Polynomial Kernel Function. This two-point interpolation kernel lookup table contains interpolation coefficients representative of a conventional fifth order polynomial kernel function $K_4(x)$, whereby interpolation pixels between two adjacent original pixels are assigned intensity values based on the following expression:

$$K_4(x) = -6|x|^5 + 15|x|^4 - 10|x|^3 + 1 \quad 0 < |x| < 1$$
$$K_4(x) = 0 \quad |x| > 1$$

The fifth order polynomial kernel function produces an apparent edge contrast between pixels in the interpolated image that is sharper than that produced by both the third order polynomial interpolation kernel function $K_3(x)$ and the bilinear replication interpolation kernel function $K_2(x)$, but smoother than that produced by the pixel replication interpolation kernel function $K_1(x)$.

B. Four-Point Interpolation Kernel Functions

5. Cubic Spline Function ($\alpha=0$). This four-point interpolation kernel lookup table contains interpolation coefficients representative of a conventional cubic spline kernel function $K_5(x)$, whereby interpolation pixels between two adjacent original pixels are assigned intensity values based on the following expression:

$$K_5(x) = (a + 2)|x|^3 - (a + 3)|x|^2 + 1 \quad 0 <= |x| <= 1$$
$$K_5(x) = a|x|^3 - 5a|x|^2 + 8a|x| - 4a \quad |x| > 1$$
$$K_5(x) = 0 \quad |x| > 2$$

With the coefficient a=0, the above interpolation kernel function $K_5(x)$ provides a relatively smooth apparent edge contrast between pixels in the interpolated image.

6. Cubic Spline Function ($\alpha=-2$). This four-point interpolation kernel lookup table corresponds to the above expression $K_5(x)$ with the coefficient $\alpha=-0.2$ to realize an interpolation kernel function $K_6(x)$. With $\alpha=-0.2$, the interpolation kernel function $K_6(x)$ produces an apparent edge contrast between pixels in the interpolated image that is sharper than that produced by the interpolation kernel function $K_5(x)$.

7. Cubic Spline Function ($\alpha=-0.4$). This four-point interpolation kernel lookup table corresponds to the above expression $K_5(x)$ with the coefficient $\alpha=-0.4$ to realize an interpolation kernel function $K_7(x)$. With $\alpha=-0.4$, the interpolation kernel function $K_7(x)$ produces an apparent edge contrast between pixels in the interpolated image that is sharper than that produced by the interpolation kernel function $K_6(x)$.

8. Cubic Spline Function ($\alpha=-0.6$). This four-point interpolation kernel lookup table corresponds to the above expression $K_5(x)$ with the coefficient $\alpha=-0.6$to realize an interpolation kernel function $K_8(x)$. With $\alpha=-0.6$, the interpolation kernel function $K_8(x)$ produces an apparent edge contrast between pixels in the interpolated image that is sharper than that produced by the interpolation kernel function $K_7(x)$.

9. Cubic Spline Function ($\alpha=-0.8$). This four-point interpolation kernel lookup table corresponds to the above expression $K_5(x)$ with the coefficient $\alpha=-0.8$ to realize an interpolation kernel function $K_9(x)$. With $\alpha=-0.8$, the interpolation kernel function $K_9(x)$ produces an apparent edge contrast between pixels in the interpolated image that is sharper than that produced by the interpolation kernel function $K_8(x)$.

10. Cubic Spline Function ($\alpha=-1.0$). This four-point interpolation kernel lookup table corresponds to the above expression $K_5(x)$ with the coefficient $\alpha=-1.0$ to realize an interpolation kernel function $K_{10}(x)$. With $\alpha=-1.0$, the interpolation kernel function $K_{10}(x)$ produces an apparent edge contrast between pixels in the interpolated image that is sharper than that produced by the interpolation kernel function $K_9(x)$.

11. Cubic Spline Function ($\alpha=-1.2$). This four-point interpolation kernel lookup table corresponds to the above expression $K_5(x)$ with the coefficient $\alpha=-1.2$ to realize an interpolation kernel function $K_{11}(x)$. With $\alpha=-1.2$, the interpolation kernel function $K_{11}(x)$ produces an apparent edge contrast between pixels in the interpolated image that is sharper than that produced by the interpolation kernel function $K_{10}(x)$.

12. Cubic Spline Function ($\alpha=-1.4$). This four-point interpolation kernel lookup table corresponds to the above expression $K_5(x)$ with the coefficient $\alpha=-1.4$ to realize an interpolation kernel function $K_{12}(x)$. With $\alpha=-1.4$, the interpolation kernel function $K_{12}(x)$ produces an apparent edge contrast between pixels in the interpolated image that is sharper than that produced by the interpolation kernel function $K_{11}(x)$.

13. Cubic Spline Function ($\alpha=-1.6$). This four-point interpolation kernel lookup table corresponds to the above expression $K_5(x)$ with the coefficient $\alpha=-1.6$ to realize an interpolation kernel function $K_{13}(x)$. With $\alpha=-1.6$, the interpolation kernel function $K_{13}(x)$ produces an apparent edge contrast between pixels in the interpolated image that is sharper than that produced by the interpolation kernel function $K_{12}(x)$.

14. Cubic Spline Function ($\alpha=-1.8$). This four-point interpolation kernel lookup table corresponds the above expression $K_5(x)$ with the coefficient $\alpha=-1.8$ to realize an interpolation kernel function $K_{14}(x)$. With $\alpha=-1.8$, the interpolation kernel function $K_{14}(x)$ produces an apparent edge contrast between pixels in the interpolated image that is sharper than that produced by the interpolation kernel function $K_{13}(x)$.

15. Cubic Spline Function ($\alpha=-2.0$). This four-point interpolation kernel lookup table corresponds to the above expression $K_5(x)$ with the coefficient $\alpha=-2.0$ to realize an interpolation kernel function $K_{15}(x)$. With $\alpha=-2.0$, the interpolation kernel function $K_{15}(x)$ produces an apparent edge contrast between pixels in the interpolated image that is sharper than that produced by the interpolation kernel function $K_{14}(x)$.

16. Cubic Spline Function ($\alpha=-2.2$). This four-point interpolation kernel lookup table corresponds to the above expression $K_5(x)$ with the coefficient $\alpha=-2.2$ to realize an interpolation kernel function $K_{16}(x)$. With $\alpha=-2.2$, the interpolation kernel function $K_{16}(x)$ produces an apparent edge contrast between pixels in the interpolated image that is sharper than that produced by the interpolation kernel function $K_{15}(x)$.

The interpolation processor 20 selects one of the above interpolation kernel lookup tables $K_1$–$K_{16}$ to improve the appearance of a visible representation of the interpolated image data based on the selected format, the selected media, and the selected appearance characteristic. The selection is made by interpolation processor 20 in recognition that the results of an interpolation kernel function can vary depending on the degree of expansion or reduction required by the format selected by format selector 12, and the response characteristic of the output media selected by output media selector 14. The processor 20 also bases the selection on an appearance characteristic, e.g., sharpness or smoothness, selected by appearance characteristic selector 14. In this manner, interpolation processor 20 selects from memory 18 the best available interpolation kernel function $K_1$–$K_{16}$ for the present conditions.

In this example, interpolation processor 20 first narrows the field of interpolation kernel lookup tables stored in memory 18 according to the format selected by format selector 12. For selected formats requiring smaller expansion rates, interpolation processor 20 selects one of the two-point interpolation kernel lookup tables $K_1$–$K_4$, in view of the lower incidence of blurring with small-scale expansion. Because the smaller expansion rate produces less blurring, a two-point interpolation kernel lookup table can provide acceptable visible results. In this manner, the selection of a two-point, rather than four-point, interpolation kernel lookup table by interpolation processor 20 reduces the amount of computational effort necessary to produce the interpolated image data. The computation time required for two-point interpolation will be less than that required for four-point interpolation by at least a factor of four. For formats requiring higher expansion rates, interpolation processor 20 selects one of the four-point interpolation kernel tables $K_4$–$K_{16}$. The interpolation processor 20 thereby produces better spatial frequency when needed to avoid the higher incidence of blurring that can occur with larger expansion. The four-point interpolation kernel requires added computation, but is necessary to ensure a pleasing or diagnostically useful visible presentation of the interpolated image data on the output media.

As an example of the criteria applied by interpolation processor 20 to select a type of interpolation kernel lookup table, satisfactory visible results have been observed for the use of two-point interpolation kernel tables with selected formats requiring expansion rates that do not exceed a factor of three in both horizontal and vertical directions. For selected formats that require expansion rates of greater than a factor of three in both horizontal and vertical directions, interpolation processor 20 should be configured to select one of the four-point interpolation kernel tables. At expansion rates of less than a factor of three, the degree of blurring that may occur with a two-point interpolation kernel has been found to be acceptable, particularly in view of the computational savings gained. At expansion rates of greater than a factor of three, the incidence of blurring generally dictates the use of an interpolation kernel producing better spatial frequency. Thus, the improved visible results achieved by use of a four-point interpolation kernel are considered to be worth the added computational effort. Of course, the question of whether the visible presentation of the interpolated image data is acceptable will ultimately be a subjective matter for the human observer. Therefore, other criteria for selecting between a two-point or four-point interpolation kernel are conceivable.

After interpolation processor 20 has narrowed the selection process to either the set of two-point interpolation kernel lookup tables or the set of four-point interpolation kernel lookup tables, the process turns to selection of a subset of lookup tables appropriate for the type of output imaging media selected by output media selector 16. Both the set of two-point interpolation lookup tables $K_1$–$K_4$ and the set of four-point interpolation kernel lookup tables $K_5$–$K_{16}$ include interpolation coefficients representing interpolation kernel functions designed to produce different appearance characteristics, i.e., different degrees of sharpness or smoothness, For example, the set of two-point interpolation kernel tables includes, in descending order of apparent sharpness, the pixel replication interpolation kernel table $K_1$, the fifth order polynomial interpolation kernel table $K_4$, the third order polynomial interpolation kernel table $K_3$, and the bilinear interpolation kernel table $K_2$. Similarly, the set of four-point interpolation kernel tables includes, in descending order of apparent sharpness, cubic spline interpolation kernel tables $K_5$–$K_{16}$ modified by the value of coefficient $\alpha$ to adjust sharpness.

The interpolation processor 20 selects a subset of appropriate interpolation kernel lookup tables by considering the response characteristics of the output imaging media, which can greatly affect the visible results of the interpolation. Thermographic dry silver film has a development speed that is significantly slower than that of conventional silver halide film, in both toe and shoulder speeds. The scanning laser in laser imager 26 may have an insufficient dynamic range to compensate for the slower development speed. Consequently, blurring can result in high contrast areas of the visible presentation of the interpolated image data, such as those areas involving a transition from image data representing alphanumeric text at a minimum density to image data representing pictorial information at much higher densities approaching maximum densitvy Similarly, a CRT display monitor suffers from severe dynamic range limitations, and therefore can also exhibit blurring in high contrast areas.

When the media selected by output media selector 16 is conventional silver halide film, interpolation processor 20 selects one of the interpolation kernel lookup tables $K_1$–$K_{16}$ producing a relatively smooth apparent edge contrast. The interpolation processor 20 selects an interpolation kernel lookup table producing a relatively smooth apparent edge contrast in recognition of the faster development speed of the silver halide film, and hence the smaller dynamic range required to reproduce the desired optical densities. As an example, if a selected format requires an expansion rate of less than three in both horizontal and vertical directions, and the selected media is silver halide film, interpolation processor 20 selects one of two-point interpolation kernel tables $K_1$–$K_4$ providing a relatively smooth apparent edge contrast, such as the bilinear interpolation kernel table $K_2$. In contrast, if a selected format requires an expansion rate of greater than three in both horizontal and vertical directions, and the selected media is silver halide film, interpolation processor 20 selects one of the four-point interpolation kernel tables $K_5$–$K_{16}$ providing a relatively smooth apparent edge contrast. For example, the sixth four-point interpolation kernel table $K_6$, with coefficient $\alpha$ set to $-0.2$, provides a particularly smooth apparent edge contrast when applied to the interpolated image data.

When the media selected by output media selector 16 is a thermographic dry silver film, interpolation processor 20 selects one of the interpolation kernel lookup tables $K_1$–$K_{16}$ producing a sharper apparent edge contrast than that for silver halide film. The interpolation processor 20 selects an interpolation kernel lookup table producing a relatively sharp appearance in recognition of the slower development speed of the dry silver film, and hence the larger dynamic range required to reproduce the desired optical densities. The sharper interpolation kernel lookup table provides a mechanism for improving the visible appearance of the presentation of the interpolated image data on the dry silver film. Specifically, the sharpness produced by the selected interpolation kernel lookup table produces an "overshoot/undershoot" effect that compensates for the slower development speed of the dry silver film. However, the overshoot and undershoot are clipped in high contrast areas by the minimum density Dmin and the maximum density Dmax.

The sharpness of the selected interpolating kernel lookup table increases the apparent spatial frequency of the interpolated image data by increasing the apparent slope between adjacent interpolated pixels. In particular, the selected interpolating kernel lookup table increases the apparent slope between minimum density Dmin and maximum density Dmax in high contrast areas, such as those involving a transition from image data representing alphanumeric text at a minimum density to image data representing pictorial information at much higher densities approaching maximum density. Of course, the other areas of the visible presentation having varying densities also will be affected by the sharper interpolation kernel lookup table. The effect is not readily apparent, however, for interpolation with formats requiring smaller expansion factors. Further, the four-point interpolation kernel lookup tables selected for formats requiring larger expansion factors conceal the effect by avoiding the introduction of a large amount of high spatial frequency artifact and aliasing.

As an example, if a selected format requires an expansion rate of less than three in both horizontal and vertical directions, and the selected media is dry silver film, interpolation processor 20 selects one of the two-point interpolation kernel tables $K_1$–$K_4$ providing a relatively sharp apparent edge contrast, such as the pixel replication interpolation kernel table $K_1$ the third order polynomial kernel table $K_3$, or the fifth order polynomial kernel table $K_4$. In contrast, if a selected format requires an expansion rate of greater than three in both horizontal and vertical directions, and the selected media is dry silver film, interpolation processor 20 selects one of four-point interpolation kernel tables $K_5$–$K_{16}$ providing relatively sharper apparent edge contrasts. For example, the interpolation kernel table $K_{14}$, with coefficient $\alpha$ set to $-1.8$, provides a very high degree of overshoot and undershoot, producing a very sharp apparent edge contrast when applied to the interpolated image data. In areas in which pixels transition from Dmin to Dmax, however, the overshoot and undershoot are clipped. Thus, the sharper interpolation kernel lookup table provides the benefits of higher apparent slope between Dmin and Dmax, compensating for the slow development speed of the dry silver film, but does not suffer significantly from the overshoot and undershoot effect, which would ordinarily be undesirable.

When the media selected by output media selector 16 is CRT display monitor 24, interpolation processor 20 selects one of the interpolation kernel lookup tables $K_1$–$K_{16}$ producing an even sharper apparent edge contrast than that required by the dry silver film. The interpolation processor 20 selects an interpolation kernel lookup table producing a relatively sharp appearance in recognition of the severely limited dynamic range of the CRT monitor. As with the dry silver film, the sharper interpolation kernel lookup table provides a mechanism for improving the visible appearance of the presentation of the interpolated image data on the CRT monitor. Specifically, the sharpness produced by the selected interpolation kernel lookup table produces the overshoot and undershoot effect to provide a higher apparent slope between maximum intensity and minimum intensity on the monitor. The overshoot/undershoot effect compensates for the limited dynamic range of the CRT monitor, but is clipped in high contrast areas by the minimum and maximum intensities. The sharpness of the selected interpolating kernel lookup table increases the apparent spatial frequency of the interpolated image data by increasing the apparent slope between adjacent interpolated pixels in high contrast areas, such as those involving a transition from image data representing alphanumeric text at a minimum intensity to image data representing pictorial information at much higher intensities approaching maximum intensity.

As an example, if a selected format requires an expansion rate of less than three in both horizontal and vertical directions, and the selected media is CRT monitor 24, interpolation processor 20 selects one of the two-point interpolation kernel tables $K_1$–$K_4$ providing a sharp apparent edge contrast. The pixel replication interpolation kernel table $K_1$ and the fifth order polynomial kernel table $K_4$, in particular, produce interpolated image data having sharper apparent edge contrasts. If a selected format requires an expansion rate of greater than three in both horizontal and vertical directions, however, and the selected media is CRT monitor 24, interpolation processor 20 selects one of the four-point interpolation kernel tables $K_5$–$K_{16}$ providing relatively sharper apparent edge contrasts. For example, the interpolation kernel table $K_{16}$, with coefficient α set to −2.2, provides a maximum degree of overshoot and undershoot, producing a very sharp apparent edge contrast when applied to the interpolated image data. The sharper interpolation kernel lookup table provides a higher apparent slope to compensate for the limited dynamic range of CRT monitor 24, thereby improving the visible presentation of the interpolated image data to a human viewer.

After interpolation processor 20 has narrowed the selection process to either the set of two-point interpolation kernel lookup tables $K_1$–$K_4$ or the set of four-point interpolation kernel lookup tables $K_5$–$K_{16}$ based on the selected format, and to a particular subset of the interpolation kernel lookup tables $K_1$–$K_{16}$ based on the selected media, the process turns to selection of a particular interpolation kernel lookup table based on the appearance characteristic selected by appearance characteristic selector 14. Thus, even though the selection by interpolation processor 20 is largely driven by format and media considerations, it still may be desirable to allow a system user some latitude for sharpness and smoothness. As a first example, if a selected format requires an expansion rate of greater than three in both horizontal and vertical directions, and the selected media is dry silver film, interpolation processor 20 selects one of the four-point interpolation kernel tables $K_5$–$K_{16}$ providing a sharp apparent edge contrast. The apparent sharpness produced by each of interpolation kernel tables $K_5$–$K_{16}$ increases in response to an increase in the coefficient α. Thus, if it is determined that interpolation kernel table $K_8$ produces a sufficient overshoot/undershoot effect to improve the visible presentation of the interpolated image data, but the system user still desires a sharper appearance, interpolation processor 20 selects a higher-numbered interpolation kernel lookup table having a coefficient α that corresponds to the desired sharpness.

Figure 3:
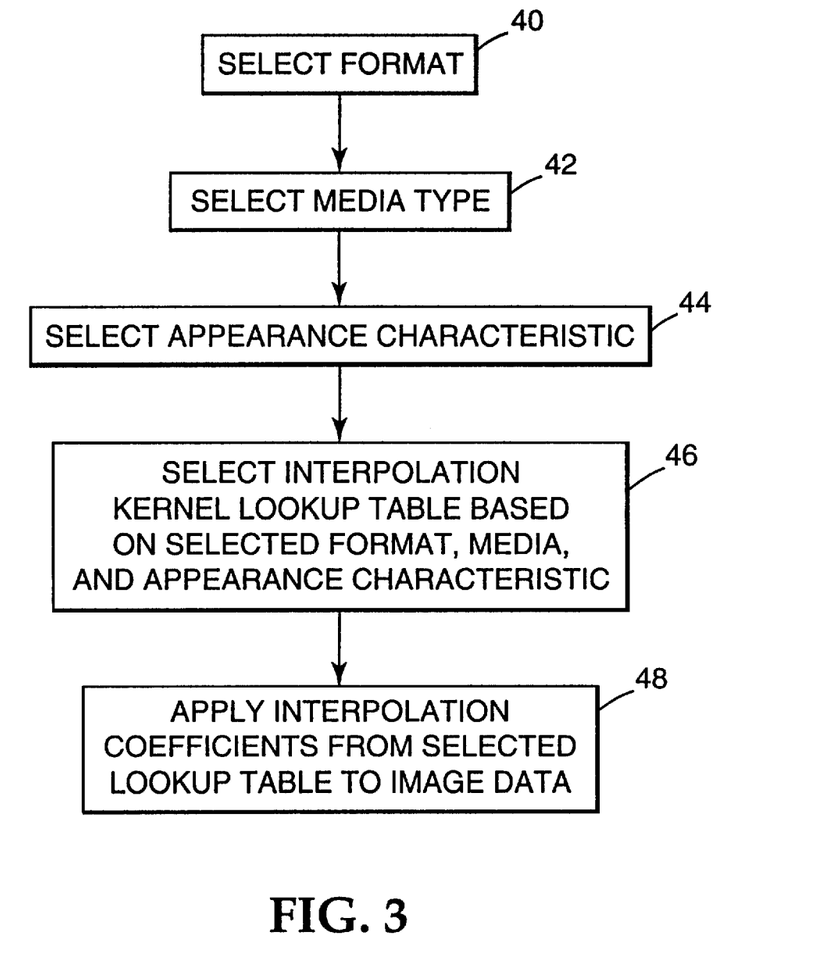
FIG. 3 is a flow diagram illustrating a method for adaptive interpolation of image data, in accordance with the present invention.

FIG. 3 is a flow diagram illustrating a method for adaptive interpolation of image data, in accordance with the present invention. It will be recognized that the method of the present invention can be readily implemented by the system 10 described above. As shown in the flow diagram of FIG. 3, the method includes a step of selecting one of a plurality of formats for presentation of an image on an imaging media, as indicated by block 40. A particular imaging media is selected for presentation of an image, as indicated by block 42. Further, one of a plurality of appearance characteristics, representing sharpness or smoothness, are selected for the presentation of the image on the imaging media, as indicated by block 44. As indicated by block 46, one of a plurality of different interpolation kernel lookup tables then is selected based on a combination of the selected format, the selected media, and the selected appearance characteristic. Each of interpolation kernel lookup tables contains a plurality of interpolation coefficients representing the interpolation carried by a different interpolation kernel functions, as described above with respect to system 10. Finally, as indicated by block 48, the interpolation coefficients contained in the selected interpolation kernel lookup table are applied to the image data to produce the interpolated image data.

EXAMPLE

The following example is provided to illustrate a system and method for adaptive interpolation of image data, in accordance with the present invention. In particular, the following example illustrates one possible implementation of the selection process carried out by the system and method of the present invention.

In this example, one of interpolation kernel lookup tables $K_1$–$K_4$ is selected if the selected format requires an expansion factor of less than or equal to three in horizontal and vertical directions, and one of interpolation kernel lookup tables $K_5$–$K_{12}$ is selected if the selected format requires an expansion factor of greater than three in horizontal and vertical direction.

If the selected media is silver halide and the selected format requires an expansion factor of less than or equal to three, one of interpolation kernel lookup tables $K_1$–$K_4$ is selected according to the selected appearance characteristic, with $K_1$ representing the sharpest appearance and $K_2$ the smoothest. If the selected media is silver halide and the selected format requires an expansion factor of greater than three, one of interpolation kernel lookup tables in the subset $K_5$–$K_{12}$ is selected according to the selected appearance characteristic, with $K_5$ representing the smoothest appearance in the subset and $K_{12}$ the sharpest.

If the selected media is dry silver and the selected format requires an expansion factor of less than or equal to three, one of interpolation kernel lookup tables $K_1$–$K_4$ is selected according to the selected appearance characteristic, with $K_1$ representing the sharpest appearance and $K_2$ the smoothest. If the selected media is dry silver and the selected format requires an expansion factor of greater than three, one of interpolation kernel lookup tables in the subset $K_8$–$K_{14}$ is selected according to the selected appearance characteristic, with $K_8$ representing the least sharp appearance in the subset and $K_{14}$ the sharpest.

If the selected media is CRT monitor 24 and the selected format requires an expansion factor of less than or equal to three, one of interpolation kernel lookup tables $K_1$–$K_4$ is selected according to the selected appearance characteristic, with $K_1$ representing the sharpest appearance and $K_2$ the smoothest. If the selected media is CRT monitor 24 and the selected format requires an expansion factor of greater than three, one of interpolation kernel lookup tables in the subset $K_{10}$–$K_{16}$ is selected according to the selected appearance characteristic, with $K_{10}$ representing the least sharp appearance in the subset and $K_{16}$ the sharpest.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A system for performing interpolation on image data representative of a plurality of pixels within one or more images to produce interpolated image data representing interpolated pixels, said system comprising:

media selection means for selecting one of a plurality of physical imaging media on which a visible presentation of said one or more images is to be formed;

format selection means for selecting one of a plurality of formats for presentation of said one or more images on said imaging media, each of the formats specifying a number of said images on said imaging media and a size of each of said images;

appearance characteristic selection means for selecting one of a plurality of appearance characteristics of said presentation of said one or more images on said imaging media;

a memory storing a plurality of different interpolation kernel lookup tables, each of said interpolation kernel lookup tables containing a plurality of interpolation coefficients;

interpolation kernel selection means for automatically selecting, based on a combination of the format selected by said format selection means, the media selected by said media selection means, and the appearance characteristic selected by said appearance characteristic selection means, one of said interpolation kernel lookup tables stored in said memory; and interpolating means for applying the interpolation coefficients contained in the selected interpolation kernel lookup table to said image data to produce said interpolated image data.

2. The system of claim 1, wherein said plurality of interpolation kernel lookup tables includes at least one interpolation kernel lookup table containing a plurality of two-point interpolation coefficients and at least one interpolation kernel lookup table containing a plurality of four-point interpolation coefficients.

3. The system of claim 1, wherein said plurality of interpolation kernel lookup tables includes an interpolation kernel lookup table containing a plurality of pixel replication interpolation coefficients, an interpolation kernel lookup table containing a plurality of bilinear interpolation coefficients, an interpolation kernel lookup table containing a plurality of third order polynomial interpolation coefficients, an interpolation kernel lookup table containing a plurality of fifth order polynomial interpolation coefficients, and an interpolation kernel lookup table containing a plurality of cubic spline interpolation coefficients.

4. The system of claim 1, wherein said plurality of appearance characteristics includes a plurality of degrees of apparent sharpness of said one or more images relative to a degree of apparent smoothness of said one or more images.

5. The system of claim 1, wherein said plurality of media includes a silver halide film, a thermographic film, and a cathode ray tube monitor.

6. A system for performing interpolation on image data representative of a plurality of pixels within one or more images to produce interpolated image data, said system comprising:

format selection means for selecting one of a plurality of formats for presentation of said one or more images on imaging media, each of the formats specifying a number of said images on said imaging media and a size of each of said images;

a memory storing a plurality of different interpolation kernel lookup tables, each of said interpolation kernel lookup tables containing a plurality of interpolation coefficients;

interpolation kernel selection means for automatically selecting, based on the format selected by said format selection means, one of said interpolation kernel lookup tables stored in said memory; and interpolation means for applying the selected interpolation kernel lookup table to said image data to produce said interpolated image data.

7. The system of claim 6, wherein said plurality of interpolation kernel lookup tables includes at least one interpolation kernel lookup table containing a plurality of two-point interpolation coefficients and at least one interpolation kernel lookup table containing a plurality of four-point interpolation coefficients.

8. The system of claim 7, wherein said plurality of interpolation kernel lookup tables includes an interpolation kernel lookup table containing a plurality of pixel replication interpolation coefficients, an interpolation kernel lookup table containing a plurality of bilinear interpolation coefficients, an interpolation kernel lookup table containing a plurality of third order polynomial interpolation coefficients, an interpolation kernel lookup table containing a plurality of fifth order polynomial interpolation coefficients, and an interpolation kernel lookup table containing a plurality of cubic spline interpolation coefficients.

9. The system of claim 6, further comprising appearance characteristic selection means for selecting one of a plurality of appearance characteristics of said presentation of said one or more images on said imaging media, said interpolation kernel selection means automatically selecting one of said interpolation kernel lookup tables stored in said memory based on both the format selected by said format selection means and the appearance characteristic selected by said appearance characteristic selection means.

10. The system of claim 9, wherein said plurality of appearance characteristics includes a plurality of degrees of apparent sharpness of said one or more images relative to a degree of apparent smoothness of said one or more images.

11. The system of claim 6, further comprising media selection means for selecting one of a plurality of imaging media for presentation of said one or more images, said interpolation kernel selection means automatically selecting one of said interpolation kernel lookup tables stored in said memory based on both the format selected by said format selection means and the media selected by said media selection means.

12. The system of claim 11, wherein said plurality of media includes a silver halide film, thermographic film, and a cathode ray tube monitor.

13. A system for performing interpolation on image data representative of a plurality of pixels within one or more images to produce interpolated image data, said system comprising:

media selection means for selecting one of a plurality of physical imaging media on which a visible presentation of said one or more images is to be formed;

a memory storing a plurality of different interpolation kernel lookup tables, each of said interpolation kernel lookup tables containing a plurality of interpolation coefficients;

interpolation kernel selection means for automatically selecting, based on the media selected by said media selection means, one of said interpolation kernel lookup tables stored in said memory; and interpolation means for applying the selected interpolation kernel lookup table to said image data to produce said interpolated image data.

14. The system of claim 13, wherein said plurality of interpolation kernel lookup tables includes at least one interpolation kernel lookup table containing a plurality of two-point interpolation coefficients and at least one interpolation kernel lookup table containing a plurality of four-point interpolation coefficients.

15. The system of claim 13, wherein said plurality of interpolation kernel lookup tables includes an interpolation kernel lookup table containing a plurality of pixel replication interpolation coefficients, an interpolation kernel lookup table containing a plurality of bilinear interpolation coefficients, an interpolation kernel lookup table containing a plurality of third order polynomial interpolation coefficients, an interpolation kernel lookup table containing a plurality of fifth order polynomial interpolation coefficients, and an interpolation kernel lookup table containing a plurality of cubic spline interpolation coefficients.

16. The system of claim 13, further comprising appearance characteristic selection means for selecting one of a plurality of appearance characteristics of said presentation of said one or more images on said imaging media, said interpolation kernel selection means automatically selecting one of said interpolation kernel lookup tables stored in said memory based on both the media selected by said media selection means and the appearance characteristic selected by said appearance characteristic selection means.

17. The system of claim 16, wherein said plurality of appearance characteristics includes a plurality of degrees of apparent sharpness of said one or more images relative to a degree of apparent smoothness of said one or more images.

18. The system of claim 13, wherein said plurality of media includes a silver halide film, a thermographic film, and a cathode ray tube monitor.

19. A method for performing interpolation on image data representative of a plurality of pixels within one or more images to produce interpolated image data representing interpolated pixels, said method comprising the steps of:

selecting one of a plurality of physical imaging media on which a visible presentation of said one or more images is to be formed;

selecting one of a plurality of formats for presentation of said one or more images on said imaging media, each of the formats specifying a number of said images on said imaging media and a size of each of said images;

selecting one of a plurality of appearance characteristics of said presentation of said one or more images on said imaging media;

automatically selecting one of a plurality of different interpolation kernel lookup tables based on a combination of the selected media, the selected format, and the selected appearance characteristic, each of said interpolation kernel lookup tables containing a plurality of interpolation coefficients; and applying the interpolation coefficients contained in the selected interpolation kernel lookup table to said image data to produce said interpolated image data.

20. The method of claim 19, wherein said plurality of interpolation kernel lookup tables includes at least one interpolation kernel lookup table containing a plurality of two-point interpolation coefficients and at least one interpolation kernel lookup table containing a plurality of four-point interpolation coefficients.

21. The method of claim 19, wherein said plurality of interpolation kernel lookup tables includes an interpolation kernel lookup table containing a plurality of pixel replication interpolation coefficients, an interpolation kernel lookup table containing a plurality of bilinear interpolation coefficients, an interpolation kernel lookup table containing a plurality of third order polynomial interpolation coefficients, an interpolation kernel lookup table containing a plurality of fifth order polynomial interpolation coefficients, and an interpolation kernel lookup table containing a plurality of cubic spline interpolation coefficients.

22. The method of claim 19, wherein said plurality of appearance characteristics includes a plurality of degrees of apparent sharpness of said one or more images relative to a degree of apparent smoothness of said one or more images.

23. The method of claim 19, wherein said plurality of media includes a silver halide film, a thermographic film, and a cathode ray tube monitor.

24. A method for performing interpolation on image data representative of a plurality of pixels within one or more images to produce interpolated image data, said method comprising the steps of:

selecting one of a plurality of formats for presentation of said one or more images on imaging media, each of the formats specifying a number of said images on said imaging media and a size of each of said images;

automatically selecting one of a plurality of different interpolation kernel lookup tables based on the selected format, each of said interpolation kernel lookup tables containing a plurality of interpolation coefficients; and applying the selected interpolation kernel lookup table to said image data to produce said interpolated image data.

25. The method of claim 24, wherein said plurality of interpolation kernel lookup tables includes at least one interpolation kernel lookup table containing a plurality of two-point interpolation coefficients and at least one interpolation kernel lookup table containing a plurality of four-point interpolation coefficients.

26. The method of claim 25, wherein said plurality of interpolation kernel lookup tables includes an interpolation kernel lookup table containing a plurality of pixel replication interpolation coefficients, an interpolation kernel lookup table containing a plurality of bilinear interpolation coefficients, an interpolation kernel lookup table containing a plurality of third order polynomial interpolation coefficients, an interpolation kernel lookup table containing a plurality of fifth order polynomial interpolation coefficients, and an interpolation kernel lookup table containing a plurality of cubic spline interpolation coefficients.

27. The method of claim 24, further comprising the step selecting one of a plurality of appearance characteristics of said presentation of said one or more images on said imaging media, said step of selecting one of said interpolation kernel lookup tables further including a step of automatically selecting one of said interpolation kernel lookup tables based on both the selected format and the selected appearance characteristics.

28. The method of claim 27, wherein said plurality of appearance characteristics includes a plurality of degrees of apparent sharpness of said one or more images relative to a degree of apparent smoothness of said one or more images.

29. The method of claim 24, further comprising the step of selecting one of a plurality of imaging media for presentation of said one or more images, said step of selecting one of said interpolation kernel lookup tables including automatically selecting one of said interpolation kernel lookup tables based on both the selected format and the selected media.

30. The method of claim 29, wherein said plurality of media includes a silver halide film, a thermographic film, and a cathode ray tube monitor.

31. A method for performing interpolation on image data representative of a plurality of pixels within one or more images to produce interpolated image data, said method comprising the steps of:

selecting one of a plurality of physical imaging media on which a visible presentation of said one or more images is to be formed;

automatically selecting one of a plurality of different interpolation kernel lookup tables based on the selected media, each of said interpolation kernel lookup tables containing a plurality of interpolation coefficients; and interpolation means for applying the selected interpolation kernel lookup table to said image data to produce said interpolated image data.

32. The method of claim 31, wherein said plurality of interpolation kernel lookup tables includes at least one interpolation kernel lookup table containing a plurality of two-point interpolation coefficients and at least one interpolation kernel lookup table containing a plurality of four-point interpolation coefficients.

33. The method of claim 31, wherein said plurality of interpolation kernel lookup tables includes an interpolation kernel lookup table containing a plurality of pixel replication interpolation coefficients, an interpolation kernel lookup table containing a plurality of bilinear interpolation coefficients, an interpolation kernel lookup table containing a plurality of third order polynomial interpolation coefficients, an interpolation kernel lookup table containing a plurality of fifth order polynomial interpolation coefficients, and an interpolation kernel lookup table containing a plurality of cubic spline interpolation coefficients.

34. The method of claim 31, further comprising the step of selecting one of a plurality of appearance characteristics of said presentation of said one or more images on said imaging media, said step of automatically selecting one of said interpolation kernel lookup tables including selecting one of said interpolation kernel lookup tables based on both the selected media and the selected appearance characteristic.

35. The method of claim 34, wherein said plurality of appearance characteristics includes a plurality of degrees of apparent sharpness of said one or more images relative to a degree of apparent smoothness of said one or more images.

36. The method of claim 31, wherein said plurality of media includes a silver halide film, a thermographic film, and a cathode ray tube monitor.

37. A system for performing interpolation on image data representative of a plurality of pixels within one or more images to produce interpolated image data, said system comprising:

a format selector for selecting one of a plurality of formats for presentation of said one or more images on imaging media, each of the formats specifying a number of said images on said imaging media and a size of each of said images;

a memory storing a plurality of different interpolation kernel lookup tables, each of said interpolation kernel lookup tables containing a plurality of interpolation coefficients;

a interpolation kernel selector for selecting, based on the format selected by said format selection means, one of said interpolation kernel lookup tables stored in said memory; and an interpolator for applying the selected interpolation kernel lookup table to said image data to produce said interpolated image data.

38. The system of claim 37, further comprising an appearance characteristic selector for selecting one of a plurality of appearance characteristics of said presentation of said one or more images on said imaging media, said interpolation kernel selector selecting one of said interpolation kernel lookup tables stored in said memory based on both the format selected by said format selector and the appearance characteristic selected by said appearance characteristic selector.

39. The system of claim 38, further comprising a media selector for selecting one of a plurality of imaging media for presentation of said one or more images, said interpolation kernel selector selecting one of said interpolation kernel lookup tables stored in said memory based on the format selected by said format selector, the media selected by said media selector, and the appearance characteristic selected by said appearance characteristic selector.

40. The system of claim 37, further comprising a media selector for selecting one of a plurality of imaging media for presentation of said one or more images, said interpolation kernel selector selecting one of said interpolation kernel lookup tables stored in said memory based on both the format selected by said format selector and the media selected by said media selector.

41. A method for performing interpolation on image data representative of a plurality of pixels within one or more images to produce interpolated image data, said method comprising the steps of:

selecting one of a plurality of formats for presentation of said one or more images on imaging media, each of the formats defining at least a number of said images formed on said imaging media and a size of each of said images;

selecting, based on the selected format, one of a plurality of different interpolation kernel lookup tables; and applying the selected interpolation kernel lookup table to said image data to produce said interpolated image data.

42. A method for performing interpolation on image data representative of a plurality of pixels within one or more images to produce interpolated image data, said method comprising the steps of:

selecting one of a plurality of physical imaging media on which a visible presentation of said one or more images is to be formed;

selecting, based on the selected imaging media, one of a plurality of different interpolation kernel lookup tables; and applying the selected interpolation kernel lookup table to said image data to produce said interpolated image data.

* * * * *